US 008744213B2

(12) United States Patent
Tatke et al.

(10) Patent No.: US 8,744,213 B2
(45) Date of Patent: *Jun. 3, 2014

(54) DIGITAL MICROSCOPE SLIDE SCANNING SYSTEM AND METHODS

(75) Inventors: Lokesh Tatke, Sunnyvale, CA (US); Suraj Somwanshi, Cupertino, CA (US); Suhas Patil, Pune (IN); Sujit Chivate, Pune (IN)

(73) Assignee: Ventana Medical Systems, Inc., Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/313,112

(22) Filed: Dec. 7, 2011

(65) Prior Publication Data

US 2012/0076436 A1 Mar. 29, 2012

Related U.S. Application Data

(63) Continuation of application No. 12/054,309, filed on Mar. 24, 2008, now Pat. No. 8,098,956.

(60) Provisional application No. 60/896,832, filed on Mar. 23, 2007, provisional application No. 60/896,852, filed on Mar. 23, 2007.

(51) Int. Cl.
*G06K 9/36* (2006.01)
(52) U.S. Cl.
USPC ........... 382/284; 342/176; 382/132; 378/174; 600/407; 600/447
(58) Field of Classification Search
CPC .................. G06T 7/0026; G06T 2207/20221; A61B 6/5241; G01S 15/8995
See application file for complete search history.

(56) References Cited

U.S. PATENT DOCUMENTS

| | | | |
|---|---|---|---|
| 4,635,293 A | | 1/1987 | Watanabe |
| 5,036,326 A | * | 7/1991 | Andrieu et al. ............... 342/176 |
| 5,123,056 A | * | 6/1992 | Wilson .......................... 382/132 |
| 5,140,647 A | | 8/1992 | Ise et al. |
| 5,428,690 A | | 6/1995 | Bacus et al. |
| 5,818,525 A | | 10/1998 | Elabd |
| 5,833,607 A | * | 11/1998 | Chou et al. .................... 600/407 |
| 5,880,778 A | | 3/1999 | Akagi |

(Continued)

FOREIGN PATENT DOCUMENTS

WO WO 2008/118886 A1 10/2008

OTHER PUBLICATIONS

PCT/US08/58077 Written Opinion dated Aug. 21, 2008.
PCT/US08/58077 IPRP dated Sep. 29, 2009.

*Primary Examiner* — Tsung-Yin Tsai
(74) *Attorney, Agent, or Firm* — Ventana Medical Systems, Inc

(57) ABSTRACT

Provided herein are systems methods including a design of a microscope slide scanner for digital pathology applications which provides high quality images and automated batch-mode operation at low cost. The instrument architecture is advantageously based on a convergence of high performance, yet low cost, computing technologies, interfaces and software standards to enable high quality digital microscopy at very low cost. Also provided is a method based in part on a stitching method that allows for dividing an image into a number of overlapping tiles and reconstituting the image with a magnification without substantial loss of accuracy. A scanner is employed in capturing snapshot images. The method allows for overlapping images captured in consecutive snapshots.

1 Claim, 6 Drawing Sheets

(56) References Cited

U.S. PATENT DOCUMENTS

| | | |
|---|---|---|
| 5,982,951 A | 11/1999 | Katayama et al. |
| 6,044,181 A | 3/2000 | Szeliski et al. |
| 6,101,265 A | 8/2000 | Bacus et al. |
| 6,195,093 B1 | 2/2001 | Nelson et al. |
| 6,215,892 B1 | 4/2001 | Douglass et al. |
| 6,239,870 B1 | 5/2001 | Heuft |
| 6,400,395 B1 | 6/2002 | Hoover et al. |
| 6,416,477 B1 * | 7/2002 | Jago .............................. 600/447 |
| 6,418,236 B1 | 7/2002 | Ellis et al. |
| 6,424,752 B1 | 7/2002 | Katayama et al. |
| 6,456,323 B1 | 9/2002 | Mancuso et al. |
| 6,463,172 B1 | 10/2002 | Yoshimura |
| 6,674,881 B2 | 1/2004 | Bacus et al. |
| 6,773,677 B2 | 8/2004 | Thorne, IV et al. |
| 6,785,427 B1 | 8/2004 | Zhou et al. |
| 6,800,249 B2 | 10/2004 | Torre-Bueno et al. |
| 6,941,029 B1 | 9/2005 | Hatori |
| 7,226,788 B2 | 6/2007 | De La Torre-Bueno |
| 7,869,641 B2 | 1/2011 | Wetzel et al. |
| 7,876,948 B2 | 1/2011 | Wetzel et al. |
| 7,961,216 B2 | 6/2011 | Grindstaff et al. |
| 8,098,956 B2 | 1/2012 | Tatke et al. |
| 8,116,543 B2 | 2/2012 | Perz et al. |
| 8,369,591 B2 | 2/2013 | Perz et al. |
| 2002/0018589 A1 | 2/2002 | Beuker et al. |
| 2002/0090120 A1 | 7/2002 | Wetzel et al. |
| 2002/0163582 A1 | 11/2002 | Gruber et al. |
| 2003/0048949 A1 | 3/2003 | Bern et al. |
| 2003/0234866 A1 | 12/2003 | Cutler |
| 2004/0009098 A1 | 1/2004 | Torre-Bueno et al. |
| 2004/0071269 A1 * | 4/2004 | Wang et al. .................. 378/174 |
| 2004/0119817 A1 | 6/2004 | Maddison et al. |
| 2005/0104902 A1 | 5/2005 | Zhang et al. |
| 2005/0110882 A1 | 5/2005 | Fukuda |
| 2005/0123181 A1 | 6/2005 | Freund et al. |
| 2005/0123211 A1 | 6/2005 | Wong et al. |
| 2005/0213849 A1 * | 9/2005 | Kreang-Arekul et al. .... 382/284 |
| 2006/0028549 A1 | 2/2006 | Grindstaff et al. |
| 2006/0034543 A1 * | 2/2006 | Bacus et al. .................. 382/284 |
| 2006/0098737 A1 | 5/2006 | Sethuraman et al. |
| 2006/0120925 A1 | 6/2006 | Takayama et al. |
| 2006/0204072 A1 | 9/2006 | Wetzel et al. |
| 2006/0213994 A1 | 9/2006 | Faiz et al. |
| 2007/0030529 A1 | 2/2007 | Eichhorn et al. |
| 2007/0031062 A1 | 2/2007 | Pal et al. |
| 2008/0152258 A1 | 6/2008 | Tulkki |
| 2008/0180550 A1 | 7/2008 | Gulliksson |
| 2008/0240613 A1 | 10/2008 | Dietz et al. |
| 2008/0278518 A1 * | 11/2008 | Mei et al. ...................... 345/629 |
| 2012/0076391 A1 | 3/2012 | Dietz et al. |
| 2012/0076411 A1 | 3/2012 | Dietz et al. |
| 2012/0092481 A1 | 4/2012 | Dietz et al. |

* cited by examiner

SLIDE DETECTION

SLIDE DETECTION of ADJACENT SLIDES

NORMAL

NORMAL ADJACENT

DOUBLE SLIDE DETECTION - ERROR

TILTED SLIDE CONDITION ERROR

DOUBLE

TILTED

DIGITAL MICROSCOPE SLIDE SCANNING SYSTEM AND METHODS

CROSS-REFERENCE

This application is a continuation application of U.S. patent application Ser. No. 12/054,309, filed Mar. 24, 2008, now U.S. Pat. No. 8,098,956, which claims the benefit of U.S. Provisional Application No. 60/896,832, filed Mar. 23, 2007, and U.S. Provisional Application No. 60/896,852, filed Mar. 23, 2007, the contents of which are incorporated herein by reference in their entirety.

BACKGROUND OF THE INVENTION

Molecular imaging-Identification of changes in the cellular structures indicative of disease remains a key to the better understanding in medicinal science. Microscopy applications are applicable to microbiology (e.g., gram staining, etc.), Plant tissue culture, animal cell culture (e.g. phase contrast microscopy, etc.), molecular biology, immunology (e.g., ELISA, etc.), cell biology (e.g., immunofluorescence, chromosome analysis, etc.) Confocal microscopy: Time-Lapse and Live Cell Imaging, Series and Three-Dimensional Imaging.

There have been advances in confocal microscopy that have unraveled many of the secrets occurring within the cell and the transcriptional and translational level changes can be detected using fluorescence markers. The advantage of the confocal approach results from the capability to image individual optical sections at high resolution in sequence through the specimen. However, there remains a need for systems and methods for digital processing of images of pathological tissue that provide accurate analysis of pathological tissues, at a relatively low cost.

SUMMARY OF THE INVENTION

The present invention provides method for reconstituting an image comprising dividing an image into a number of overlapping tiles captured in consecutive snapshots and reconstituting the image with a magnification without substantial loss of accuracy. A digital scanner is employed in capturing snapshot images.

In one embodiment the method comprises calculating stitch points between two consecutive snapshots acquired by the scanner for stitching adjacent tiles. Images have a common overlap of at least N pixels between them wherein N is greater than 1 pixel.

In one embodiment, the overlap between two adjacent tiles is up to 30% of the total pixels in each tile.

In another embodiment, the overlap between two adjacent snapshots is up to 25%, up to 20%, up to 15%, up to 10%, up to 5%, or up to 1% of the total pixels in each tile.

In yet another embodiment the overlap between two adjacent snapshots is up 1% of the total pixels in each tile.

In yet another embodiment the method of the invention does not require alignment between adjacent snapshots.

In a further embodiment the method allows more flexibility in motion control while taking the snapshots.

In a still further embodiment stitching involves a step with an input comprising a set of two images and an output comprising stitch points for stitching the two images.

In yet another embodiment the stitching is carried out through corner points selected in overlapping regions of the two tiles to be stitched. The step comprises determining correspondence between corner points in a minimum overlap region, for example in the left/top (herein after referred as Tile1) and maximum overlap region in the right/bottom (herein after referred as Tile2). The search region around the corner and the number of corners are iteratively increased until a desired match is achieved. The strength of the correspondence computation may be enhanced by employing schemes such as voting, and histograms of displacement values. A confidence value is associated with the computed stitch displacement. The confidence may be computed using methods that include but are not limited to statistical measures and cross correlation values, In yet another embodiment the stitching may be carried out based on finding the difference between an overlap region in the two tiles. For example, a method for computing the difference includes, without limitation, measuring difference of pixel values along two corresponding lines of the two image tiles. This is based in part on the observation that the pixel difference would be minimum along the line when the lines match in the two tiles. The method may include selecting a candidate line in the first tile and searching for the corresponding best match in the second tile. The search may be restricted to the region of expected overlap in the second tile. The search space includes both horizontal and vertical directions. The optimal point is found where the mean pixel difference is minimized. The accuracy of the method in enhanced method by considering a multitude of candidate lines in the first tile and finding the best match in the second tile. A consensus is measured using all candidates. A measure evaluates the goodness of the candidate lines in the first tile. The goodness measure includes but is not restricted to using the variance of the pixels in the line.

In yet another embodiment the stitching may be carried out based on cross-correlation using multiple sized windows between the overlapped regions of the two tiles to be stitched. Candidate windows are selected in the first image based on goodness values. A measure of goodness value includes but is not limited to the contrast or variance of the pixels within the window. Candidate matching windows in the second tile are iteratively found by first searching for the candidate using smaller windows and then increasing the size of the windows for more accurate estimates. For each window location on the first tile, multiple candidates are found in the second tile which are qualified and rejected in multiple iterations. The search is extended by iteratively adding candidate windows in the first tile.

In a further embodiment the stitch points identify the area of overlap between adjacent images wherein the overlap area is cropped from one of the images such that when the adjacent images are put together the entire scene is rendered without loss of information.

In a further embodiment the images are not transformed by blending, warping and there is no significant loss of image information.

In a further embodiment the pixels in the overlap region between adjacent tiles are stored as the "seams" of the stitching.

In still a further embodiment the output produces an image at least equivalent to a tiling system that takes an image and through motion control moves the high resolution camera such that the image boundary is aligned with no or negligible overlap of images.

Another embodiment of the invention provides a method for correcting a scanned image.

In one embodiment the correction employs a flat field correction algorithm.

In yet another embodiment the method employs air-blank or glass-blank image in conjunction with solving non-uniform illumination and abrasions.

In a further embodiment the correction step comprises:
capturing a glass blank image or air-blank image;
smoothing the image using Gaussian filter (e.g.; radius 10);
dividing each pixel in image by Max of R, G and B plane values and then reciprocating the image;
calculating a multiplying factor for R, G and B planes for each pixel; and
multiplying all the pixels in the given image with multiplying factor determined from the blank image.

One embodiment provides a method for reconstituting an image comprising dividing the image into a number of overlapping tiles captured in a series of snapshots and reconstituting the image with a magnification without substantial loss of accuracy; wherein the method comprises:
capturing snapshot images through a digital scanner;
calculating stitch points between two consecutive snapshots defining a first tile and a second tile, respectively; wherein the first and second tile images have a common overlap of at least N pixels between them; wherein the method further comprises:
  a. detecting and recording corner points in a minimum overlap region and a maximum overlap region, whereby detected corner points or a selected subset of corner points are sorted and maintained in a list;
  b. for each corner point selected in the first tile, determining a set of possible stitch points in the second tile; wherein candidate points are selected using a goodness criterion;
  c. maintaining a pair of stitch points that have a matching score that is greater than a defined or computed threshold;
  d. computing a displacement between the tiles;
  e. calculating a confidence score associated with the computed displacement; and
  f. determining a stitching point for stitching the first and second tiles displaying or showing the stitch image for further analysis.

Another embodiment provides a method wherein stitch points identify an area of overlap between tile 1 and tile 2.

Another embodiment provides a method further comprising cropping the overlap area from one of the image tiles such that when the first and second tiles are put together an entire scene is rendered without significant loss of information.

Yet another embodiment provides a method further comprising correcting a scanned image by:
  a. capturing a glass blank image or Air-blank image;
  b. smoothing the image;
  c. dividing each pixel in the image by Max of R, G and B plane values and then reciprocating the image;
  d. computing a multiplying factor for R, G and B planes for each pixel; and
  e. multiplying all the pixels in the given image with multiplying factor determined from the blank image to apply flat-field correction to the given image and displaying or storing the corrected image for further analysis.

Another aspect of the invention provides a slide rack autoloader for use in a digital microscope slide scanning system comprising a user removable rack comprising multiple slide holders.

In one embodiment the holders hold 20 slides per basket and are arranged with two stacked baskets in four columns.

In another embodiment the slide autoloader further comprises a reflective, IR sensor, for example, at a distance of few millimeters from the end of the slides.

In yet another embodiment the slide rack auto-loader further comprises a detector which looks at light scattered from the slide.

In yet a further embodiment the slide rack auto-loader comprises four laser/detector pairs to scan down each of the four rows of slides.

In still another embodiment, as the slide rack is translated vertically, each slide is sensed and the position recorded.

In a further embodiment the positions are used for:
determining which slides are present for scanning and/or
determining the required vertical height to safely extract the slide from the rack for scanning.

In still another embodiment the invention provides a slide rack autoloader comprising:
low cost, non-contact slide detector sensor system to determine which slides are present;
sensor system to accurately determine slide position for safe slide extraction from rack to scanning system; and
set of standard slide racks for compatibility to other slide processing equipment.

BRIEF DESCRIPTION OF THE DRAWINGS

Features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
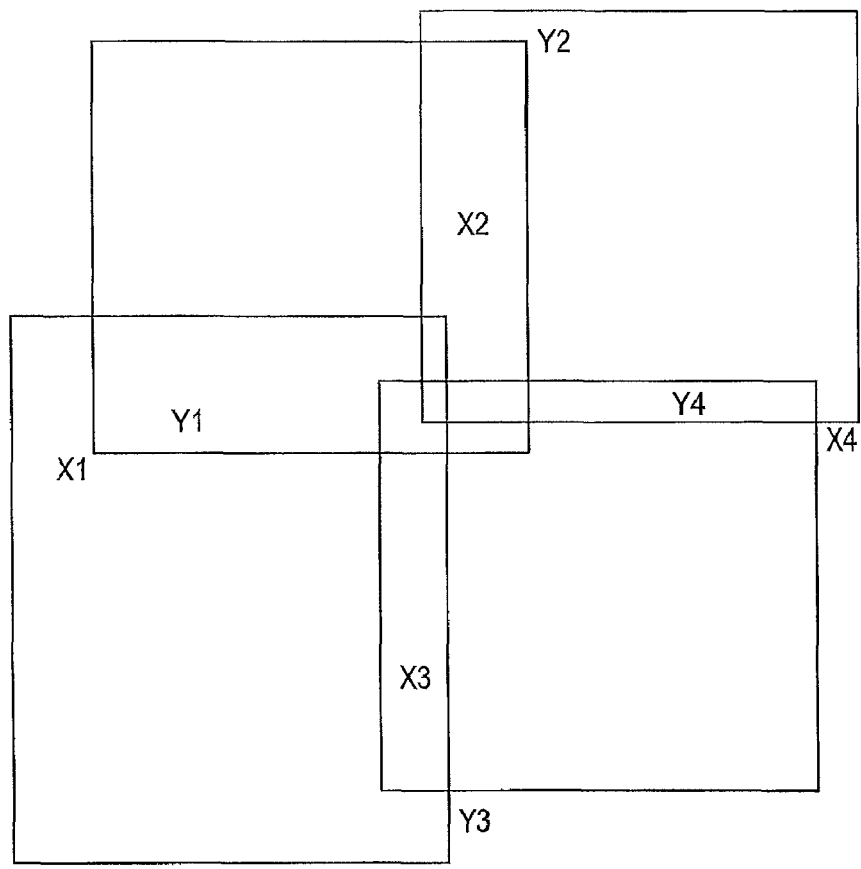
FIG. 1 shows a tile translated in the XY plane according to one embodiment of the invention.

In one embodiment, the invention provides a design of a microscope slide scanner for digital pathology applications which provides high quality images and automated batch-mode operation at low cost. High quality optics and high precision mechanical systems are generally very expensive, and existing products that address this need are priced accordingly. The instrument architecture implemented according to the invention is advantageously based on a convergence of high performance, yet low cost, computing technologies, interfaces and software standards to enable high quality digital microscopy at very low cost.

The invention is based in part on a stitching method that allows for dividing an image into a number of overlapping tiles and reconstituting the image with a magnification without substantial loss of accuracy. A scanner is employed in capturing snapshot images. The method allows for overlapping images captured in consecutive snapshots. One embodiment computes the stitch points between two consecutive snapshots acquired by the scanner. These images have a common overlap of at least N pixels between them. N is greater than 1 pixel. The method of the invention allows for significant overlap between consecutive snapshots. The method provides reconstituted images that are a substantially accurate magnification of an original slide with overlaps of up to 30% of the tile. That is, if each snapshot comprises 1000 pixels, the overlap between two adjacent snapshots can be up to 300 pixels. The method provides results of increasing accuracy with overlaps between two adjacent snapshots of up to 25%, up to 20%, up to 15%, up to 10%, up to 5%, or up to 1%. A 1% overlap between two adjacent snapshots containing 1000 pixels each is 10 pixels, which is significantly more than overlap allowed by conventional methods. That is, the invention provides substantially accurate magnified renderings while allowing significant overlap between adjacent snapshots.

Allowing a substantial overlap (significantly more than 1 pixel) between adjacent snapshots in the order of 1% or more of the total pixels in the tile provides great flexibility in the design of the scanner. Embodiments of the invention do not require the levels of accuracy in positioning the snapshots required by conventional methods. There is no need to require alignment between adjacent snapshots. In addition, allowing for overlap and providing an accurate method for processing overlapping snapshots provides more flexibility in motion control while taking the snapshots.

In one embodiment, the input to the stitching method is a set of two images and output is the stitch points to be used for stitching the two images to form an image combining the features contained in the two images or image tiles. The steps involved include the following— a. Detect and record corner points in the minimum overlap region in the left/top (Tile1) and maximum overlap region in the right/bottom (Tile2). All detected corner points or a selected subset of corner points are sorted and maintained in a list.

b. For each corner point selected in Tile 1, the method determines the set of possible stitch points in Tile 2. The candidate points are selected using a goodness criterion that is based on but not restricted to the tolerance band around each point in tile 1.

c. Maintain the pair of stitch points that have a matching score that is greater than a defined or computed threshold. An example matching score is the cross correlation of the intensity values around the corner point. Other matching scores may be used and are contemplated to be with the scope of the invention.

d. Robust methods are used for computing the final displacement between the tiles. These methods include but are not limited to using the votes associated with each candidate displacement. For example, the displacement histogram of all the corner points of tile 1 computes the votes. A displacement getting the most votes and satisfying an acceptance criterion is chosen as the final displacement.

e. A confidence score is associated with the computed displacement. An example confidence measure is the cross correlation values. Alternative statistical or non statistical methods can also be used.

f. If a robust displacement estimate is not available then the computation is repeated by iteratively increasing the search region and/or relaxing the goodness criterion of step b above.

g. If the algorithm still fails to get the stitch point return the error code indicating stitching failure.

In one embodiment, the stitch points identify the area of overlap between adjacent images. This overlap area is cropped from one of the images such that when the adjacent images are put together the entire scene is rendered without significant loss of information. The images used in this operation are not transformed by blending, warping, etc., therefore there is no significant loss of image information. The output of this operation produces an image at least equivalent to a tiling system that takes an image and through complicated motion control moves the high resolution camera such that the image boundary is aligned (within one pixel) with negligible overlap of images. For example, for a conventional system utilizing a 20× microscope objective, the pixel size is about one-half of a micron. A rule of thumb for specifying the resolution of the motion control would be 5-10× better than the accuracy a conventional method would be attempting to achieve, therefore the motion control system required by such conventional method would be about 0.05 to 0.1 micron. Use of a 40× scanner would require resolutions of the motion control system to 0.025 to 0.05 micron. For example, the Aperio Scanscope T2 utilizes a Renishaw RGH24G tape scale optical encoder with a resolution of 0.05 or 0.1 micron. By contrast, the method of the invention does not require such high level of accuracy in motion control system, allowing the cost of production of the scanner to be greatly reduced.

The methods of the invention allow for the pixel values in the overlap regions between the tiles that are not used in the final composed image to be saved. The saved seams are used for evaluating the quality of the stitching and for correcting any introduced errors.

The methods of the invention allow for obtaining images of high accuracy while providing much flexibility in the scanner design. Coupling the methods of the invention with high performance PCs, with fast processors, large amounts of memory, and very high capacity disk drives, which today can be obtained at very reasonable cost enables the system designer to relax the specifications and performance requirements for the optical and mechanical subsystems without compromising the quality of the images obtained. Since these subsystems are typically the most expensive parts of a digital microscope, the total cost of the system can be greatly reduced with the approach provided by the present invention.

In another embodiment the invention provides a method for correcting a scanned image. In this embodiment, a flat field correction algorithm is employed for correcting the image using air-blank or glass-blank image and solving non-uniform illumination and abrasions.

In one embodiment, the method comprises the following steps:

a. Capturing a glass blank image or Air-blank image.

b. Smoothing the image, for example, by using Gaussian filter (radius 10)

c. Dividing each pixel in the image by Max of R, G and B plane values and then reciprocating the image.

d. Computing multiplying factor for R, G and B planes for each pixel.

e. Multiplying all the pixels in the given image with multiplying factor determined from blank image to apply flat-field correction to the given image.

The image correction method according to the invention is advantageous in that it allows for solving the non-uniform illumination observed on the acquired images. For example, the image acquired may be rectangular (due to the CCD design) and the illumination being projected on the slide for acquiring image may be circular as it comes through the objective.

The present invention also provides method for finding a region of interest in a slide of a tissue using a low resolution (thumbnail) image of the whole tissue in the slide to help a scanner to start scanning the slide only in the region of interest and thus avoids the unnecessary scan of the entire slide. In one embodiment, the thumbnail image is capture in a single shot.

An embodiment of the invention segments the thumbnail image into different regions of the slide and identifies the different regions including the region that corresponds to the tissue area.

A further embodiment first segments and identifies the label region of the glass slide image. Most pathology glass slides have a label attached on the slide. These regions have the barcode and other identifying information printed on a label. In some cases handwritten markings are left on the glass. All such label regions are segmented and identified by finding the bounding box that encloses all the information.

An embodiment of the invention identifies the cover-slip boundaries on the glass slide. The tissues are usually placed under a glass coverslip on the slide. The four boundaries of the coverslip are straight lines that are usually aligned to the horizontal or the vertical. However, they may also be at an angle. The invention detects the presence of such straight lines and combines the information to detect the cover slip boundary.

An embodiment of the current invention also detects the staining artifacts that appear at the edges of the coverslip and the slides.

An embodiment of the invention detects the tissue area within the region left out after the label, staining artifacts, and the cover slip boundaries are detected. Within the remaining area the method segments the pixels into tissue vs. non-tissue. The steps involve the automatic detection of an intensity threshold that separates tissue pixels from the non tissue pixels. Following the detection of a kernel region of tissue, the region is grown to incorporate the entire tissue area. The growing process uses automatically determined hysterisis thresholds that allow light tissue also to be included into the regions. Small hypothesized areas are removed as they usually correspond to dirt or artifacts on the slide. As a final step all the detected tissue areas are merged into a larger region of interest for the scanning process.

In one embodiment, the invention provides a method for finding a region of interest using the thumbnail image of the whole tissue in the slide. This helps the scanner to start scanning the slide only in the region of interest and thus avoids the unnecessary scan of the entire slide.

The thumbnail image consists of a representation of the glass slide as a whole. This includes the label and the actual tissue spread on the glass slide.

Acquiring the thumbnail image has the following benefits.

The label from the thumbnail image can be used an identifier. The label image may have a barcode specifying the details of the case, stain type used etc. It may also have label information that may not include a barcode. This can be used as a cross verification tool to correlate the glass slide with the actual image.

The thumbnail image also gives a very good indication of the tissue spread on the glass slide. The tissue spread on the glass slide is determined by the algorithm of the invention.

The method of the invention allows for saving time while scanning the glass slide, as only the area with the tissue needs to be imaged and the surrounding empty glass slide need not be scanned.

The method of the invention also allows better identification of focus points. This helps selection of a proper auto focus algorithm based on the layout of the tissue on the slide.

The embodiment of the invention detects the different regions within the slide and identifies the region corresponding to the tissue area of interest. The steps involved in the detection of region of interest are a. Identify regions containing characters written on the slide. Sometimes there are characters written near labels on the slide. This step first determines the presence of such characters near the label and then tries to identify the region that contains these characters. The detection procedure identifies such regions by a combination of geometrical and color information. Remove the identified regions for searching the tissue region of interest.

b. The dark black regions (like black label strip and corner regions) are also removed from the ROI input gray image. A combination of geometric and color information is used to robustly detect such regions.

c. Identify cover slip lines in the Thumbnail AOI (Area of Interest) input image. A line detector that is biased towards horizontal lines is used for the detection. An example of such a method, but is not restricted to, uses the Hough transform. A set of horizontal edges magnitude peaks are identified in the regions of the images where the cover slip is expected to be present e.g. Lower part (0 to Image_Height/6) and Upper part (Image_Height to Image_Height/3) of the image. The number of such peaks is also a program parameter or is selected based on empirical evidence. A validation step verifies that the detected lines define a valid cover slip region. The detected area is then used to update the bounding box within which the tissue is searched.

d. One embodiment for the identification of tissue region within search bounding box consists of
   i. Processing the input RGB image in the L*ab color space.
   ii. Enhancing the contrast in the L (Luminosity) channel
   iii. Smoothing the image by applying an appropriate smoothing filter. An example of such a filter is a gaussian with a parameterized kernel size.
   iv. Automatically computing a threshold for the pixel intensity such that the tissue pixels are distinguished from the background pixels. One such method for automatic detection comprises finding the large change in the histogram. Compute the histogram and find Maximum of the derivative. Consider only the middle span of the histogram. The threshold value is a function of the detected change in histogram point.
   v. Another method of automatically computing the threshold is by using a Mixture of Gaussian model for the foreground pixels.
   vi. Yet another method of automatically computing the threshold is the use of OTSU method/algorithm.
   vii. Yet another method of automatically computing the threshold is the use of k-means clustering on the intensity values.
   viii. Threshold image using the values computed and segment into foreground and background.
   ix. Fill Holes in the segmented objects and then grow the foreground region. The region growing procedure uses a second threshold parameter computed from the image data and a hyperparameter set based on empirical data.
   x. Another method of automated threshold selection for region growing distinguishes between whole tissue slides (WS) and tissue microarray (TMA) slides. The distinction between TMA and WS is based on using the feature that the TMA has a regular grid of tissue samples placed on the slide. The regularity of grid feature is detected using the frequency spectrum information of the image.

xi. Final optional post processing is done using Morphological opening to smooth borders.

e. Identify the regions of interest using the segmented image:

i. Label the segmented objects to get the area and bounding box information for each object.

ii. Combine overlapping object AOIs if any.

iii. Reject smaller objects or objects spanning across the image from left to right with a very small height as these are cover slip artifacts in the image. Reject edge connected objects with high aspect ratio.

f. Delete small AOIs identified in the image as these are small artifacts in the image.

The invention also provides scanning imaging systems with features that enhance image analysis when combined with the image processing methods disclosed herein.

In one embodiment, the invention provides a scanning imaging system with a flexible and adaptive illumination.

Illumination: Brightfield microscopy typically uses Kohler illumination, which is a commonly used technique that provides even illumination over the desired field of view. In Kohler illumination, each point in the field of view is illuminated by a "cone" of light, with a cone angle designed to match the numerical aperture of the microscope objective. The illuminated area is also matched to the field of view of the objective. Kohler illumination typically requires a powerful light source, because to achieve uniform illumination, the light source is imaged into the sample plane at very high magnification, which means that most of the light source energy is rejected by the illumination system. Such light sources are expensive, require large power supplies, generate significant heat, and also have very short lifetimes.

To enable low-cost digital microscopy for pathology, it is desirable to use solid-state light sources such as LEDs. These require very low power, which reduces the need for large power supplies and heat sinks, and also have long lifetimes, reducing system maintenance costs. Another advantage of LED illumination is stable spectral output. With lamps, the color spectrum changes drastically with intensity, but this is not the case with LEDs. Microscopes using incandescent lamps often use blue filters in the illumination path, to remove the yellowish tint. With LEDs, this is not required.

The invention provides an illumination system that can mimic Kohler illumination system but uses white LEDs, with the following characteristics:

a. Commercially available, inexpensive white LED, consisting of a blue LED die, covered with phosphor coating to broaden the spectrum through the visible region.

b. Adjustable illumination area, to match the field of view of the objective.

c. Adjustable numerical aperture (up to max of 0.5 NA), to appropriately fill and match the numerical aperture of the microscope objective.

d. Very low power, typically 50 to 100 mW (versus 10 to 100 Watts with typical lamps)

e. Approximately 20% variation in illumination intensity across the field of view, corrected (flat-fielded) by software calibration techniques.

Imaging system: The design described herein can be implemented using a conventional 20×/0.5 NA infinity-corrected microscope objective, that is available from several manufacturers. Together with a tube lens, it projects an image of the sample on to a CCD sensor, with pixel count of 1024 by 768, and 4.65 micron pixel pitch. To achieve image pixels with approximately 0.5 micron spacing (which is approximately the same as the resolution of the objective), we need 10× magnification from the sample to the CCD. This is achieved by using a tube lens with focal length of 90 mm, which is ½ the focal length of the 180 mm tube lens used in a standard microscope. With this magnification, each image captured by the camera covers a rectangular field of 0.512 mm by 0.384 mm. The invention is not limited to the 1024×768 CCD sensor. For example, with appropriate choice of tube lens, higher density arrays such as 1032×776 or 1392×1032 or 1624×1224 can be used to increase the rectangular field at the object plane. Choosing higher density, larger CCD arrays, further decreases the scan time by acquiring fewer frames while maintaining optical resolution. The trade-off with increasing array size is the potential difficulty in correcting focus in the frame area if the biological tissue varies widely in height.

Coupled with the illumination system described above, the required exposure time to saturate a high-quantum-efficiency CCD is approximately 500 microseconds. Also, since it is possible to drive the LED with significantly higher power, up to 1 or a few Watts, it is possible to reduce the exposure time down to approximately 10 to 50 microseconds In normal operation, the LED current and/or CCD exposure time is adjusted before starting a scan, so that an image of a "blank" sample will result in nearly a full-scale, or "saturated" signal on the CCD camera. While scanning, the LED current and CCD exposure time remain fixed at those values.

Slide-scanning operation: To scan an entire microscope slide with a "tiled image" architecture (see FIG. 1), the slide is translated in X and Y (the focus axis is in Z), pausing at each frame location while an image is acquired. Using the camera and imaging system described above, to scan an area of 15 mm by 15 mm requires approximately 1400 image frames. (This number allows for some overlap between adjacent frames, which is required to adaptively stitch the frames together.) To achieve reasonable scan speeds of approximately 5 minutes per microscope slide, it is required to move very quickly from one frame to the next, focus the objective in that location, acquire the focused image, then move to the next frame and repeat the process. The stitching methods of the invention allow for reduced motion control, for example higher motion speed, yet preserve the accuracy of the processed slides.

An additional benefit of using LEDs relates to the short duration, high brightness exposure which allows an alternative method of scanning comparable to "on-the-fly" scanning Whereby the stage is commanded to execute a constant velocity move and the camera acquires images at a timing that allows coverage, minimal overlap of one frame to the next, of the complete area of interest on the slide. At 500 microsecond and lower, no image blur is encountered at the appropriate choice of stage velocity. By eliminating the step and settle times associated with the aforementioned step-and-repeat method scan times can be further reduced.

Another aspect of the invention relates to the flexibility provided in the vibrations allowed while taking the snapshots. For tiled imaging systems, it is critical that system vibrations be minimized and allowed to dampen out before the frame image is captured. Vibration amplitudes that are more than about 1/10 of a pixel would cause blurring of the image. However, any delays to allow vibrations to dampen can increase the scan time considerably. For example, a 200 ins delay at each frame, multiplied by 1400 frames, would add over 4 minutes to the total scan time for a 15 mm by 15 mm region.

By providing a very bright illumination source coupled with a very sensitive detector, it is possible (as described above) to capture images with very short exposure times. If the exposure time is short enough relative to the vibration velocity of the sample, it is acceptable to capture the image before the vibrations have dampened to sub-pixel amplitudes. Effectively, the short exposure is acting as a strobe light to freeze an image of the moving sample. The disadvantage to this technique is that the image is captured at an unknown phase of the vibration ring-down process. The result is that the XY location of the sample is not precisely known, and a software technique will be required to adaptively stitch adjacent images together at the correct relative positions. The stitching techniques described herein allow the user to overcome this problem.

This technique can be extended to use feedback from electronic acceleration sensors, to accurately time the image acquisition to occur at a certain phase in the vibration ringdown profile. For example, the image could be acquired at a peak of vibration excursion, when the vibration velocity is near zero. Another mode of operation would be to capture the image at a zero-crossing of the measured acceleration, which would allow for image acquisition with the minimized vibrational position uncertainty. The accelerometer can also be used to detect when external vibrations, such as a user bumping against the instrument, may have caused imaging blurring. In this case, the portion of the image that is suspect can be automatically re-scanned, or a warning can be displayed to the user.

The embodiments described here allow for a low-cost, high speed, tiled imaging system. Other features of the system of the invention include:

a. bright light source
 b. imaging detector with high quantum efficiency
 c. image capture without regard to vibrations, both internally-generated and externally-generated.
 d. software algorithms to correct for position uncertainty due to vibration
 e. optionally, the invention may use feedback from acceleration sensors to fine-tune the timing of image capture to minimize blurring, or to minimize position uncertainty due to vibration.

In another embodiment, the invention provides a slide auto-loader system: The design of a microscope slide scanner for digital pathology applications generally requires the user to scan many specimen slides in a high throughput fashion. Consequently, the instrument must allow the user to load many slides at a single time. A slide auto-loader system should:

a. Detect all available slides in the system without user input.
 b. If possible, use off-the-shelf slide racks for compatibility with prior and subsequent processing equipment for ease of use.
 c. Detect and select slides improperly positioned in the slide rack to ensure no slide breakage.

Figure 2:
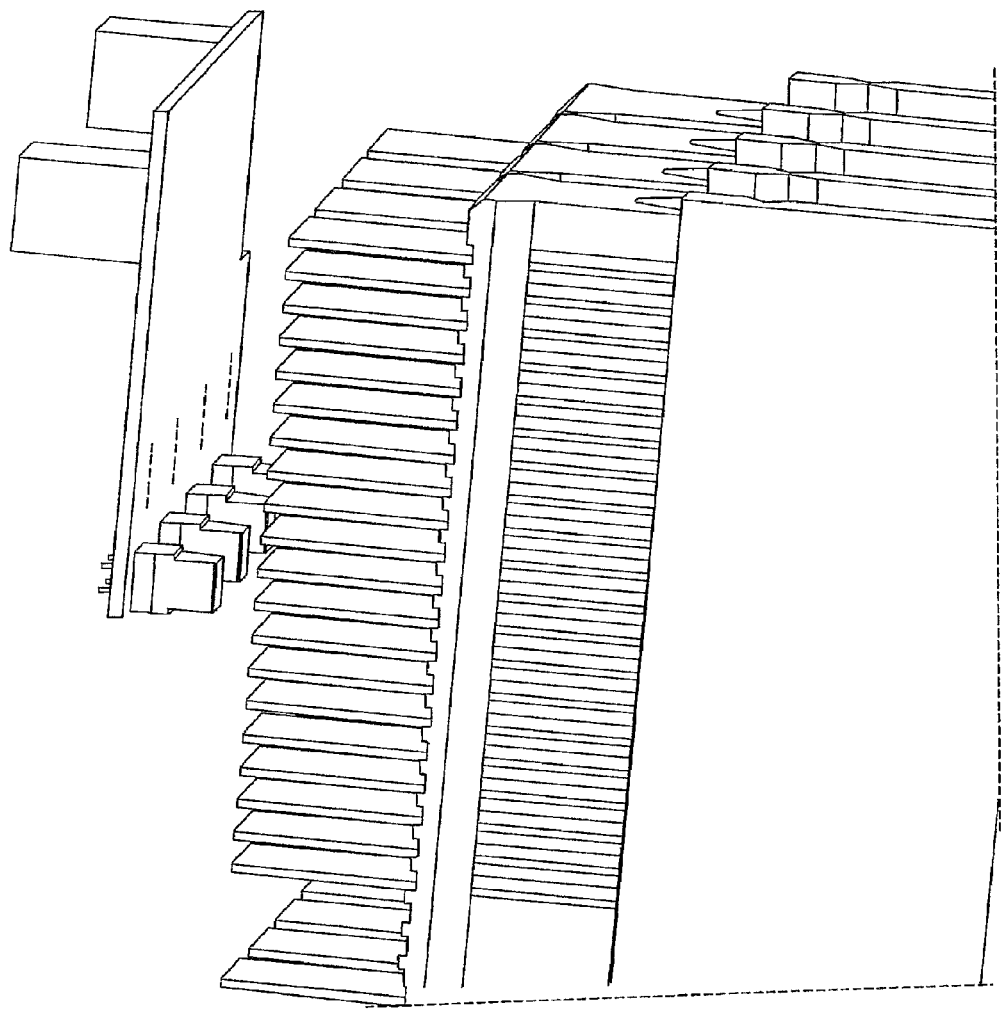
FIGS. 2 and 3 show a slide rack according to one embodiment of the invention.
Figure 3:
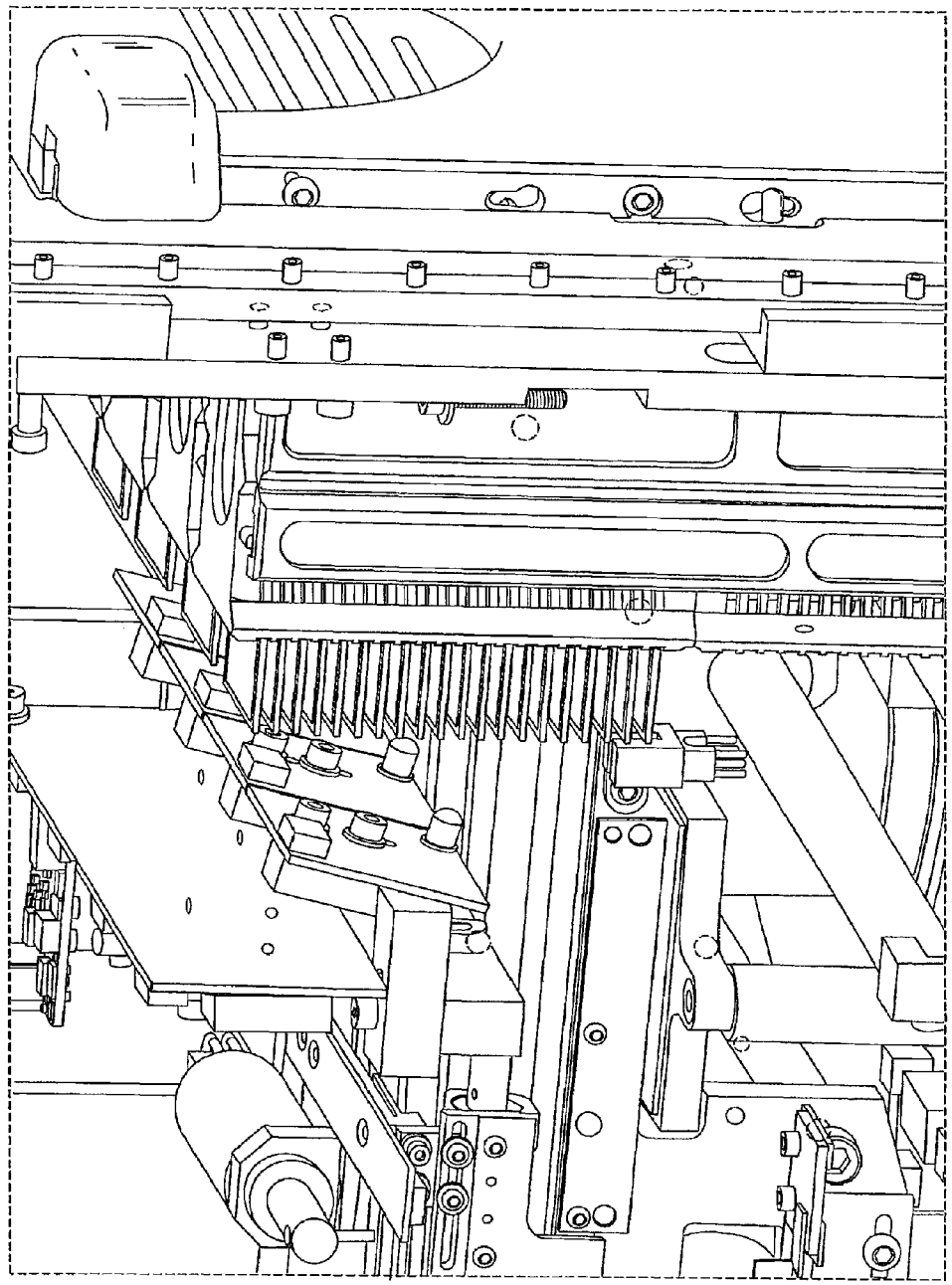

FIGS. 2 and 3 illustrate slide rack auto-loader systems as described herein. Other system configurations are also contemplated.

Figure 4:
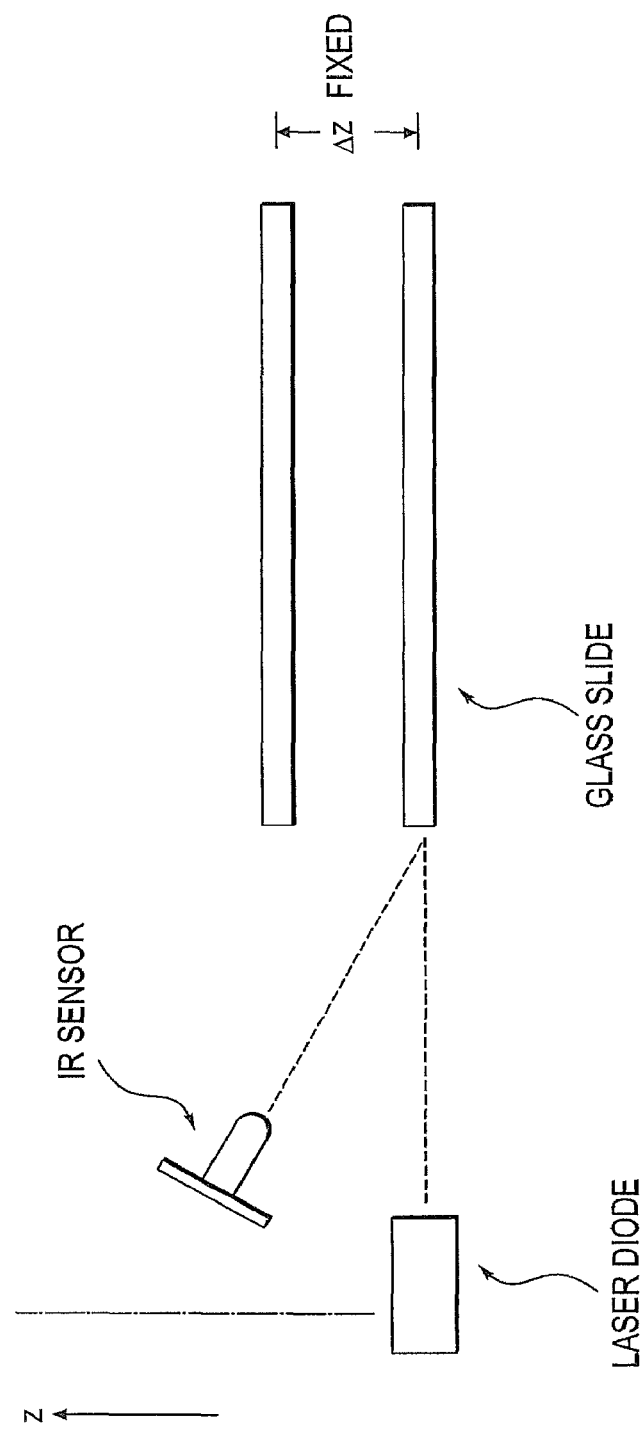
FIG. 4 shows how a detector looks at light scattered from a slide.
Figure 5B:
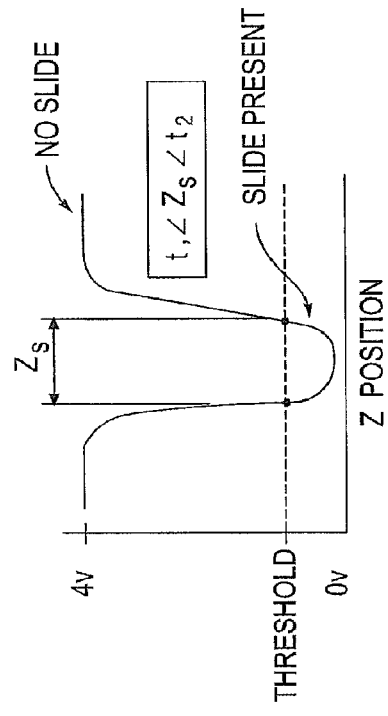
FIG. 5b shows the resulting detected laser pulse wherein the width of the pulse $z_s$ is compared to reference values $t_1$ and $t_2$.
Figure 6B:
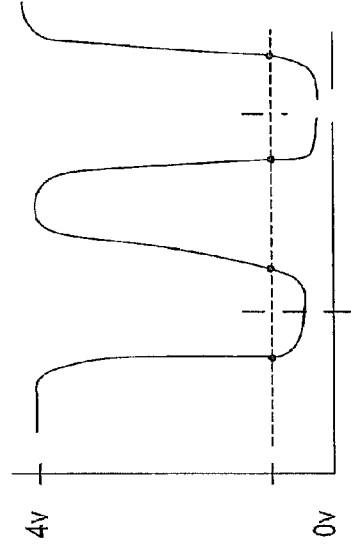
FIG. 6b shows the resulting detected laser pulses.
Figure 5A:
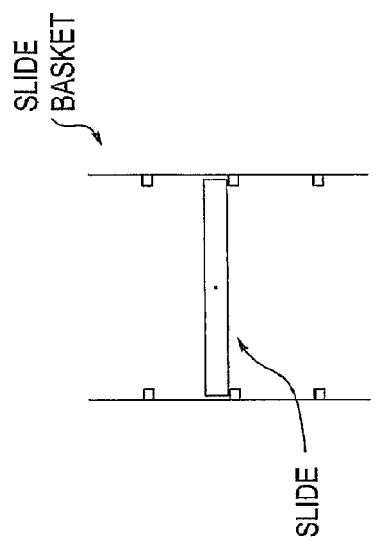
FIG. 5a shows a slide from an end on view in a properly loaded condition.

In one embodiment according to the invention, the slide rack auto-loader comprises a user removable rack that contains multiple commercial slide holders. In this embodiment, the commercial racks are Sakura baskets (Part #4768) holding 20 slides per basket and arranged with two stacked baskets in four columns. The assembly is shown below. A reflective, IR sensor such as Fairchild #QRE00034 is placed a few millimeters from the end of the slides. Alternatively, an inexpensive laser diode, such as those used on laser pointers can be used to obtain greater selectivity of the slide edge. This laser is monitored by a detector which looks at light scattered from the slide. This is shown schematically in FIG. 4. In one embodiment, the invention uses 4 laser/detector pairs to scan down each of the 4 rows of slides. As the slide rack is translated vertically, each slide edge reflects laser light to the detector. The detector produces an analog voltage change which is fed to an A/D on a microprocessor. The shape of the reflected light pulse can be processed in terms of width of pulse and height of pulse to determine if a slide is in the slide basket slot or not. Furthermore, the shape of the reflected light pulse can be used to determine if two slides are loaded into the same slot or a slide is tilted within the slot. This information is useful to prevent mishandling or damage of slide by the slide grabber mechanism. FIG. 5a shows a slide from an end on view in a properly loaded condition. FIG. 5b shows the resulting detected laser pulse wherein the width of the pulse $z_s$ is compared to reference values $t_1$ and $t_2$. If $z_s$ falls between the reference values slide picking continues, if $z_s$ falls either below or above the reference values an error condition is produced.

Figure 6A:
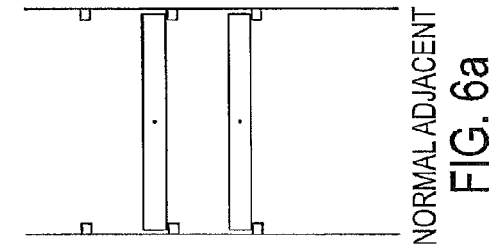
FIG. 6a shows two slides in adjacent slots presented in an end on view.
Figure 7B:
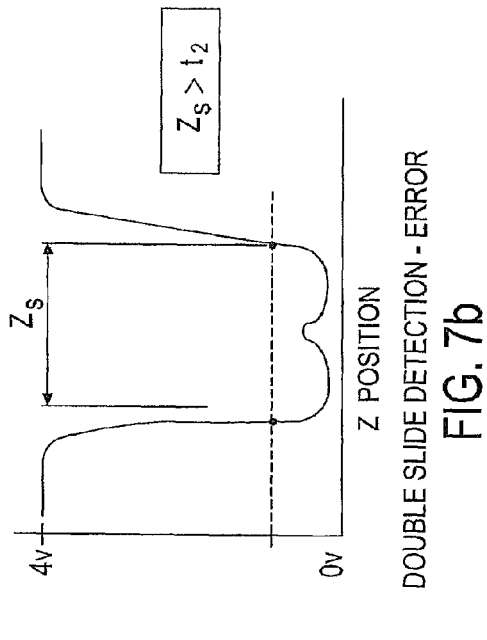
FIGS. 7a, 7b, 8a and 8b illustrate how error conditions are detected. A double-slide condition is shown in FIG. 7a along with the detector signals shown in 7b and a tilted slide condition is shown in FIG. 8a along with the detector signals shown in 8b.
Figure 8B:
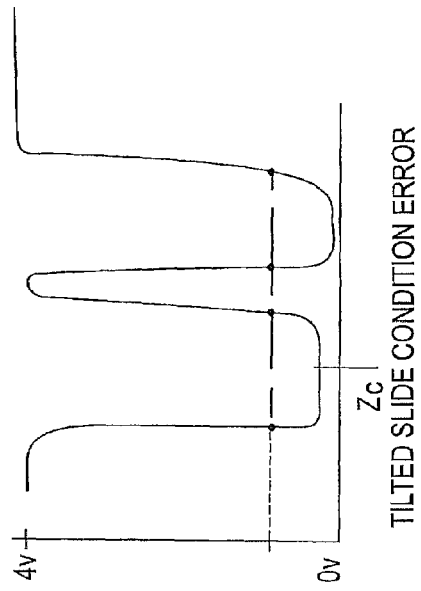
Figure 7A:
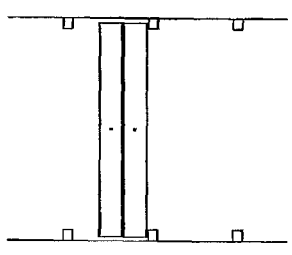
Figure 8A:
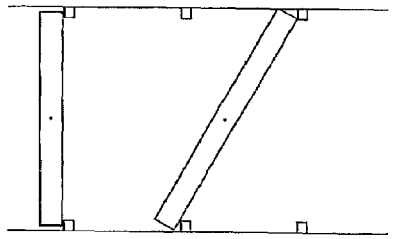

Referring to FIG. 6a two slides are presented in adjacent slots again presented in an end on view. The pulse widths are compared as explained above and the spacing or pitch of the pulse widths are compared to additional reference value $z_1$. If the pitch of pulse widths are not within $z_1$ of a multiple of fixed slide positions an error is produced. Two important error conditions are detected with this methodology, a double-slide condition shown in FIG. 7a along with the detector signals shown in 7b and a tilted slide condition shown in FIG. 8a along with the detector signals shown in 8b.

The detection means is robust for the myriad of slide widths, thicknesses and surface finishes encountered in pathology labs.

The positions of slide present in slot are used for:

a. Determining which slides are present for scanning.
 b. Determining the required x, y, z position to safely extract the slide from the rack for scanning.

Thus, the invention provides a low-cost, high volume slide auto-loader system. In one embodiment, the autoloader according to the invention comprises:

a. A low cost, non-contact slide detector sensor system to determine which slides are present.
 b. Sensor system to accurately determine slide position for safe slide extraction from rack to scanning system.
 c. Set of standard slide racks for compatibility to other slide processing equipment.
 d. A means for detecting a misloaded slide which prevents errors or damage to the slide from the slide grabber mechanism.

The slide auto-loader of the invention is advantageous in that conventional scanner equipment either do not auto-detect slides or utilize expensive sensors systems to detect slides.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for reconstituting an image comprising dividing an image into a number of overlapping tiles captured in consecutive snapshots; reconstituting the image with a magnification without substantial loss of accuracy; and displaying or storing a reconstituted image; wherein the method comprises calculating stitch points between two consecutive snapshots acquired by the scanner for stitching adjacent tiles, wherein the stitching involves an input comprising a set of two images and wherein an output comprising stitch points for stitching the two images and further comprises:
  i. converting input image to a gray scale image;
  ii. in the overlapped region of first image, finding scan boxes with good contrast;
  iii. sorting scan boxes with descending order of contrast so as to start a search for the stitch point with scan box of highest gradient;
  iv. selecting a scan box with good contrast in first image and start search for a matching scan box in the second image;
  v. for all the good contrast scan boxes in the first image, repeat following steps, till a stitch point is determined:
    a. perform first level cross correlation with the scan box of size 3×3 with an overlap region in the second image;
    b. if the value of cross correlation of this box is greater than 0.91, extend the scan box to the size of 16×16 and perform a second level cross correlation with the corresponding extended box in the second image;
    c. find the highest value of the second level cross correlation and if it is less than 0.9, get the next scan box in the list and go to step b above;
    d. make a list of all the scan boxes in the second image whose cross correlation with the scan box in first image is less than the highest value of cross correlation by 0.05;
    e. for the list of scan boxes, find a diagonally opposite scan box and perform cross correlation with a diagonally opposite scan box in the first image;
    f. find the highest value of cross correlation of diagonally opposite scan boxes in the left image with the diagonally opposite scan boxes in the right image;
    g. if this value is less than 0.455, get the next scan box in the list and go to step b above; and
    h. otherwise break the loop and declare the stitch point found; whereby the left top coordinate of the scan box in the first image and left top coordinate of the scan box with highest correlation in the second image are declared as the stitch points.

* * * * *